Patented Nov. 4, 1930

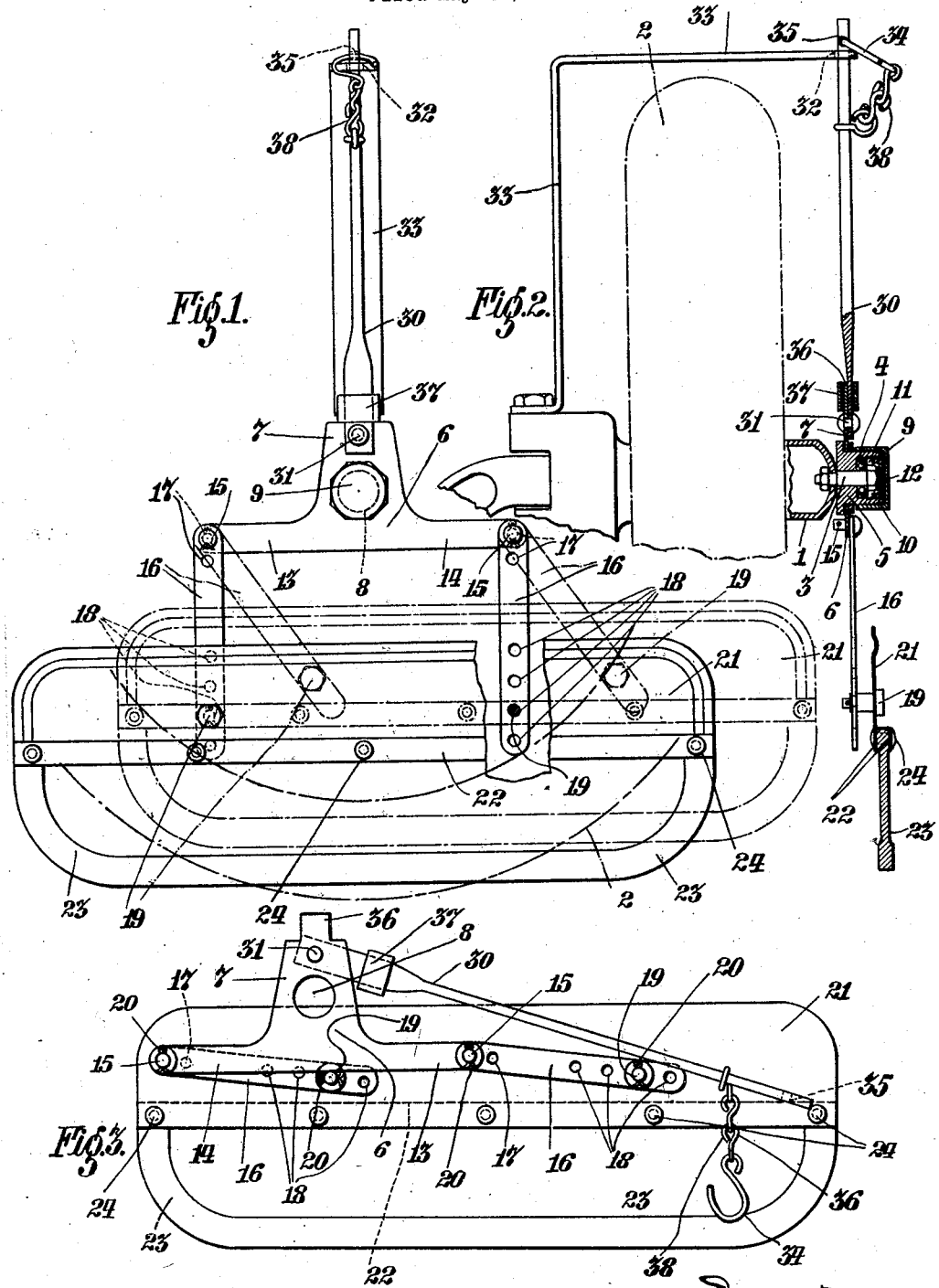

1,780,640

UNITED STATES PATENT OFFICE

WILLIAM BURNS, OF GLASGOW, SCOTLAND

LATERAL SPLASH GUARD FOR ROAD VEHICLES

Application filed May 15, 1929, Serial No. 363,393, and in Great Britain April 19, 1929.

This invention relates to lateral splash guards of the type comprising an apron or screen (hereinafter termed screen for convenience) adapted to be suspended outside the lower part of a road vehicle wheel by means carried by the hub cap of the wheel or other part of the vehicle.

The object of the present invention is to provide a generally improved construction of said guards.

To the attainment of this object, in a splash guard of the type specified above the screen is carried by links depending from the suspending means.

Preferably, I provide a frame adapted to be rotatably mounted on the wheel hub, downwardly depending links turnably mounted on said frame, a screen, means for attaching the lower ends of said links to said screen in such a manner that the links can turn relatively thereto, and means for staying the frame member; the whole being so arranged that the screen can swing upwards, forwardly, or rearwardly of the vehicle, automatically to avoid any obstruction.

Means are also provided to enable the various parts to be adjusted to suit different sized vehicles and accessories used thereon and also to permit the guard to be readily attached to and detached from the vehicle; such means making the guard applicable to existing vehicles with a minimum of alteration.

In addition, the guard will be so constructed that, when detached from the vehicle, it can be folded, or collapsed, so as to occupy a minimum amount of space.

A practical embodiment will now be described, by way of example, reference being made to the accompanying drawings, wherein:—

Fig. 1 is a side elevation of the splash guard as applied to a motor road vehicle.

Fig. 2 is an end elevation thereof.

Fig. 3 is an elevation of the splash guard detached looking at the inner side thereof and showing it in a collapsed condition.

As shown, the guard is fitted to the hub 1 of the wheel 2 by means of a fixed bolt 3 on which is mounted a ball anti-friction bearing 4 carrying, in a rotatable manner, a frame supporting member 5. On this member 5 is mounted the inverted T-shaped frame 6 the stem 7 of which is provided with a hole 8 to fit over the said supporting member 5 on which it is removably detained by the hexagonal cap 9 internally screw threaded to screw on to the screwed extension 10 of the frame supporting member. By this arrangement the frame can remain stationary when the wheel and its hub rotate. The extension 10 is made hollow to form a grease box 11, the extension being internally screw threaded to receive the externally screw threaded grease cap 12.

On the ends of the branches 13 and 14 of the inverted T-shaped frame are mounted, by means of the removable pins 15, links 16, 16. These links are provided at the upper ends with holes 17, 17 through one of which one of the pins 15 pass, while at the lower ends they are provided with holes 18, 18 through one of which the pins 19 pass. The pins are normally prevented from detachment by the split or cotter pins 20. The pins 19 are fixed upon the sheet metal member 21 forming part of the screen, this sheet metal member 21 having a channel portion 22 at its lower edge in which a moulded rubber or other flexible screen member 23 is clamped by rivets 24. With this arrangement the screen can normally hang at the side of the wheel as shown in full lines in Fig. 1 but on striking an obstacle it can move by the swinging of the links 16 upwardly and rearwardly or forwardly so as automatically to avoid said obstruction. It will normally tend to return to its proper position by its weight.

In order to prevent the frame turning with the wheel this is stayed by means of the vertical stay member 30 which is pivotally mounted at 31 on the stem 7 of the frame and is adapted to be engaged in a hole 32 in a bracket 33 extending over the wheel and fixed to a stationary part of the axle of the wheel and to be retained by the hook 34 engaging in the eye 35, the hook being permanently attached by a chain 38 to the stay member. The stay member is fixed to the frame by means of a keeper 37 slidably mounted thereon and engaging with a projection 36 on the stem 7. By sliding the keeper upwardly off the projection 36 the stay member can be turned about its pivot into the position shown in Fig. 3 and by reason of the links 16 the frame also can be collapsed into the position shown in that figure reducing its size to a minimum for convenience of storage when not in use.

By selecting the holes 17 and 18 in the links through which the pins 15 and 19 are passed the guard can be adjusted to suit different sizes of vehicle wheel and tires.

I claim:—

1. A lateral splash guard for a vehicle wheel comprising an axial lateral projection fixed on the wheel, a sleeve rotatably mounted thereon by means of an internal ball bearing, a screw plug for insertion into the sleeve to totally enclose the ball bearing and to form a grease box, a frame mounted on the sleeve and carrying a splash screen, a removable cap adapted to be secured over the end of the sleeve and forming a flange for retaining the frame on the sleeve, and a connection between the frame and a non-rotary part of the vehicle to prevent rotation of the frame.

2. A lateral splash guard for a vehicle wheel comprising an axial lateral projection fixed on the wheel, a sleeve rotatably mounted thereon by means of an internal ball bearing, a screw plug for insertion into the sleeve to totally enclose the ball bearing and to form a grease box, a frame mounted on the sleeve and carrying a splash screen, a removable cap adapted to be secured over the end of the sleeve and forming a flange for retaining the frame on the sleeve, a rod pivoted to the frame, means for locking the rod rigidly to the frame, means on a non-rotary part of the vehicle wherewith the rod can slidably engage at its upper end, and means for removably retaining the rod in such engagement.

In testimony whereof I affix my signature.

WILLIAM BURNS.